United States Patent [19]

Isomura et al.

[11] Patent Number: 5,059,107

[45] Date of Patent: Oct. 22, 1991

[54] APPARATUS FOR PRODUCING ANNULAR FIBER AGGREGATE

[75] Inventors: Renichi Isomura; Mitsuyoshi Shirotani; Tomohito Ito; Hidetoshi Hirai, all of Kariya, Japan

[73] Assignee: Kabushiki Kaisha Toyoda Jidoshokki Seisakusho, Kariya, Japan

[21] Appl. No.: 489,200

[22] Filed: Mar. 6, 1990

[30] Foreign Application Priority Data

Mar. 9, 1989 [JP] Japan .................................. 1-57345

[51] Int. Cl.$^5$ ...................... B29C 35/08; B29C 41/16
[52] U.S. Cl. .............................. 425/174.8 R; 162/192; 264/24; 264/108; 425/174.8 E; 425/456
[58] Field of Search ............... 264/24, 107; 425/174.6, 425/174.8 R, 174.8 F, 85, 84, 388, 456; 162/192

[56] References Cited

U.S. PATENT DOCUMENTS

| | | | |
|---|---|---|---|
| 3,843,756 | 10/1974 | Talbott et al. | 264/24 |
| 4,752,202 | 7/1988 | Gomi et al. | 264/24 |
| 4,786,366 | 11/1988 | Ito et al. | 244/108 |
| 4,814,127 | 3/1989 | Toyoda | 264/56 |
| 4,826,569 | 5/1989 | Ito et al. | 162/145 |
| 4,938,844 | 7/1990 | Ito et al. | 264/108 |

FOREIGN PATENT DOCUMENTS

A3731823 7/1988 Fed. Rep. of Germany .
63-227853 9/1988 Japan .
1-208429 8/1989 Japan .
A2121023 12/1983 United Kingdom .

Primary Examiner—Jay H. Woo
Assistant Examiner—Khanh P. Nguyen
Attorney, Agent, or Firm—Brooks Haidt Haffner & Delahunty

[57] ABSTRACT

An apparatus for producing annular fiber aggregate includes: a container including an inner cylinder and an outer cylinder disposed concentrically, whereby forming an upright cylindrical space between the inner cylinder and the outer cylinder; at least a pair of positive electrode and negative electrode disposed by turns and buried in the wall of the outer cylinder, parallely with respect to the axis of the upright cylindrical space; a filter member disposed at the lower portion of the upright cylindrical space; and a voltage applicator connected to the positive electrodes and the negative electrodes. Since the apparatus has the positive and negative electrodes buried in the wall of the outer cylinder, the fibers are hardly disturbed and lifted by the positive and negative electrodes even when the positive and negative electrodes are rotated relatively around the axis of the upright cylindrical space. Thus, a fiber aggregate can be obtained in which the fibers are oriented in the peripheral tangent direction uniformly and favorably, and the strength thereof in the direction perpendicular to the peripheral tangent direction has been further enhanced.

7 Claims, 3 Drawing Sheets

APPARATUS FOR PRODUCING ANNULAR FIBER AGGREGATE

BACKGROUND OF THE INVENTION

1. Field of the Invention

This invention relates to an apparatus for producing fiber aggregate which is appropriate for the production of fiber reinforced metal, and more particularly to an apparatus for producing annular fiber aggregate in which most of the fibers are oriented in the peripheral tangent direction.

2. Description of the Prior Art

A basic technology has been known for obtaining fiber aggregate in which most of the fibers are oriented one-dimensionally. In the basic technology, a fiber suspension in which fibers are dispersed in a dielectric fluid is supplied in an electric field generated between a positive electrode and a negative electrode disposed in parallel, whereby the fibers are oriented electrostatically, bridged simultaneously, and the thus oriented fibers are sedimented on after another.

According to the basic technology, fiber aggregate can be obtained in which most of the fibers are oriented one-dimensionally or linearly. Although this fiber aggregate has its own applicability, there are many functional parts of annular or cylindrical shape to which the application of fiber reinforced metal has been desired strongly. However, the fiber aggregate of linearly oriented fibers cannot satisfy the quality requirements of the functional parts of annular or cylindrical shape.

An invention, disclosed in Japanese Unexamined Patent Publication No. 227853/1988 and illustrated in FIGS. 4 and 5, is intended for solving the above-mentioned problem. In the invention, electric fields are generated among a plurality of pairs of a positive electrode 5 and a negative electrode 6 disposed alternately within the upright cylindrical space 4 in the normal direction with respect to the periphery of the upright cylindrical space 4, and a fiber suspension in which discontinuous fibers such as short fibers and whiskers are dispersed in a dielectric fluid 11 is supplied in the electric fields to orient the fibers in the peripheral tangent direction and bridge the fibers simultaneously, thereby sedimenting and aggregating the thus oriented fibers one after another. While sedimenting and aggregating the oriented fibers, the positive electrodes 5 and the negative electrodes 6 are rotated gently, and the position of the positive electrodes 5 and the negative electrodes 6 is displaced successively and relatively in the longitudinal direction of the upright cylindrical space 4 to keep the clearance, formed between the bottom ends of the positive electrodes 5 and the negative electrodes 6 and the aggregated fiber layer 12, at a predetermined value.

In the above-mentioned annular fiber aggregate production technology, although the plurality of the pairs of the positive and negative electrodes 5 and 6 is formed in a circular or net shape, and rotated gently in the fiber suspension in order to orient the fibers uniformly, the rotation of the positive and negative electrodes 5 and 6 tends to adversely affect and disturb the fibers under the orientation and bridging. In addition, when the positive and negative electrodes 5 and 6 are displaced perpendicularly so as to keep the predetermined clearance between the bottom ends thereof and the sedimented and aggregated fiber layer 12, the electric fields inevitably concentrate on the bottom ends of the positive and negative electrodes 5 and 6, and the fibers adjacent to the surface of the aggregated fiber layer 12 are lifted consequently, thereby causing another disturbance to the fibers having been oriented and aggregated so far.

SUMMARY OF THE INVENTION

It is a technical assignment of this invention to get rid of the causes of the disturbance in the oriented fibers as much as possible, thereby obtaining an annular fiber aggregate in which most of the discontinuous fibers are oriented orderly in the peripheral tangent direction.

The above and other objects are achieved by an apparatus for producing annular fiber aggregate according to this invention having the following novel arrangements. Namely, the apparatus comprises: a container comprising an inner cylinder and an outer cylinder disposed concentrically, thereby forming an upright cylindrical space between the inner cylinder and the outer cylinder; at least a pair of positive electrodes and a pair of negative electrodes disposed alternately and buried in the wall of the outer cylinder parallel with to the axis of the upright cylindrical space; a filter member disposed at the lower portion of the upright cylindrical space; and a voltage applicator connected to the positive electrodes and the negative electrodes. The apparatus may further comprise means for relatively rotating the outer cylinder and the filter member around the axis of the upright cylindrical space and drain means disposed on the bottom wall of the container. Moreover, it is preferable to make the aforementioned component members other than the electrodes from an insululating material.

One of the major features of this invention is that the positive and negative electrodes are buried in the wall of the outer cylinder parallel with to the axis of the upright cylindrical space. The inner surfaces of the positive and negative electrodes may be formed and buried so that they follow along with the inner periphery wall of the outer cylinder. The number of the positive and negative electrodes is not limited specifically, but it is preferable that the positive electrodes and the negative electrodes are disposed alternately, and that they are spaced equally, thereby forming electric fields of a substantially equal strength between the positive and negative electrodes.

The other major feature of this invention is that the apparatus may have means for relatively rotating the outer cylinder and the filter member around the axis of the upright cylindrical space. The most preferable form of the means is adapted to rotate the filter member together with the inner cylinder while fixing the outer cylinder. When employing such a form, the following advantages come to be available: no convection current resulting from the migration of the oriented fibers occurs in the dielectric fluid when bringing the electrodes to a standstill, a uniform relative angle variation can always be obtained between the bridged fibers and the sedimented fibers because the fiber aggregate is held stable by the friction forces exerted by the filter member and the inner cylinder, and no tiresome measures are required for absorbing the rotary movement of the wires connected to the electrodes.

Here, the above-mentioned inner cylinder includes a cylinder body in a strict sense as well as a pillar or column body. Further, when aggregating electrically conductive fibers, it is preferable to coat the exposed surfaces of the above-mentioned positive and negative electrodes with an anion exchange membrane and a cation exchange membrane respectively in order to prevent the fibers from short-circuiting and to suppress the turbulent flow in the fiber suspension. Furthermore, the voltage applicator may be either a direct current applicator or an alternate current applicator of a low frequency.

The fiber aggregate is produced as follows: the fibers such as short fibers and whiskers are dispersed in the dielectric fluid to make the fiber suspension, the fiber suspension is supplied into the upright cylindrical space where the electric fields are generated by the positive and negative electrodes, and the outer cylinder and the filter member may be rotated relatively and gently.

As for the above-mentioned fibers, all fibers classified in the category of short fibers and whiskers may be used, and the diameter and the length of the fibers are not limited specifically. Regarding the material long the fibers, it may be any material as far as the fibers are oriented electrostatically in the dielectric fluid when they are supplied in a predetermined electric field in the form of the fiber suspension. For instance, the following may be employed for the material: alumina, silica, alumina-silica, beryllia, carbon, silicon carbide, silicon nitride, glass and metals of various kinds. Additionally, two or more of the above materials may be mixed and used.

The dielectric fluid means a fluid exhibiting the dielectric property when a voltage is applied thereto. For instance, the following may be listed: carbon tetrachloride, fluorine and chlorine substituted hydrocarbon, n-hexane, cyclohexane and the like. Carbon tetrachloride is particularly preferable among these dielectric fluids, and fluorine and chlorine substituted hydrocarbon is superior in view of the handling and the safety. Further, a surface active agent may be added to the dielectric fluid for the purpose of dispersing the fibers in the dielectric fluid as uniformly as possible. As the surface active agent, it is usually preferable to add a nonionic surface active agent in a predetermined amount.

The strength of the electric fields generated between the positive and negative electrodes by applying a voltage thereto may usually fall in the range of approximately 0.5 to 5 kv/cm. When the strength is 0.2 kv/cm or less, the fibers are not sufficiently oriented electrostatically. When the strength is approximately 10 kv/cm or more, disturbance occurs in the fiber suspension to deteriorate the accuracy of the fiber orientation. It is most preferable that the strength of the electric fields falls in the range of approximately 1 to 2 kv/cm. The strength of the electric fields depends on the type of fibers employed, the dielectric property of the dielectric fluid employed and the thickness of fiber aggregate to be produced, and is adjusted to an optimum value accordingly.

The dielectric fluid is placed in the electric fields by supplying the fiber suspension therein. Each of the fibers in the dielectric fluid is oriented in the peripheral tangent direction in a manner directing one end thereof to one of the positive electrodes and directing the other end thereof to one of the negative electrodes, and is sedimented simultaneously. To put it differently, the fibers are aggregated on the filter member while varying the orientation direction by a small degree, the fiber suspension is supplied until the aggregation reaches a predetermined thickness, and the dielectric fluid is discharged by an amount substantially equal to the supply amount. In the discharge operation, care for adjusting the discharge amount must be taken in order not to dynamically disturb the dielectric fluid. It is preferable that the dielectric fluid flows out of itself or is discharged by suction. The discharging operation of the dielectric fluid by way of the filter member, disposed at the lower portion of the upright cylindrical space, is not only effective to adjust the flow amount but also to avoid the leakage of the fibers and the disturbance in the dielectric fluid. As for the filter member, porous ceramic may be utilized.

After completing the operation of aggregating and finally the operation of discharging and removing the residual dielectric fluid, the fiber aggregate of annular shape is taken out of the production apparatus, and utilized as a fiber preform for fiber reinforced metal for making a functional part of an annular shape.

As has been described in detail so far, since the production apparatus according to this invention has the electrodes for generating the electric fields buried in the outer wall of the fiber orientation space (the upright cylindrical structure), the direct disturbance to the dielectric fluid due to the movement of the electrodes and the fiber lifting phenomenon due to the concentration of the electric fields at the bottom ends of the electrodes have been eliminated completely. Thus the disturbance in the oriented fibers has been reduced remarkably. Further, since the oriented and bridged fibers accordingly aggregate one after another while generating phase differences among themselves when the outer cylinder with the positive and negative electrodes buried therein and the filter member receiving the oriented and bridged fibers thereon are rotated relatively and gently, it is possible to obtain a fiber aggregate in which the fibers are oriented in the peripheral tangent direction uniformly and favorably. Especially, when means for rotating the filter member with respect to a fixed outer cylinder at low speeds is employed, no oriented fibers migrate while bringing the electrodes to a standstill. Thus, the convection current in the dielectric fluid resulting from the fiber migration is eliminated naturally. Moreover, when a vibrator for vibrating the whole production apparatus is employed, the vibrator has remarkable effect by the further elimination of uneven density in the fiber aggregate. Since it has been known that the fiber reinforced metal produced by employing the above-mentioned fiber aggregate of annular or cylinder shape exhibits excellent properties in terms of the strength, the thermal expansion and the like, the properties of the fiber reinforced metal will not be described herein in detail.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Having generally described this invention, a further understanding can be obtained by reference to a certain specific preferred embodiment which is provided herein for purposes of illustration only and are not intended to be limiting unless otherwise specified.

A preferred embodiment of a fiber aggregate production apparatus according to this invention will be hereinafter described with reference to FIGS. 1 and 2.

Figure 1:
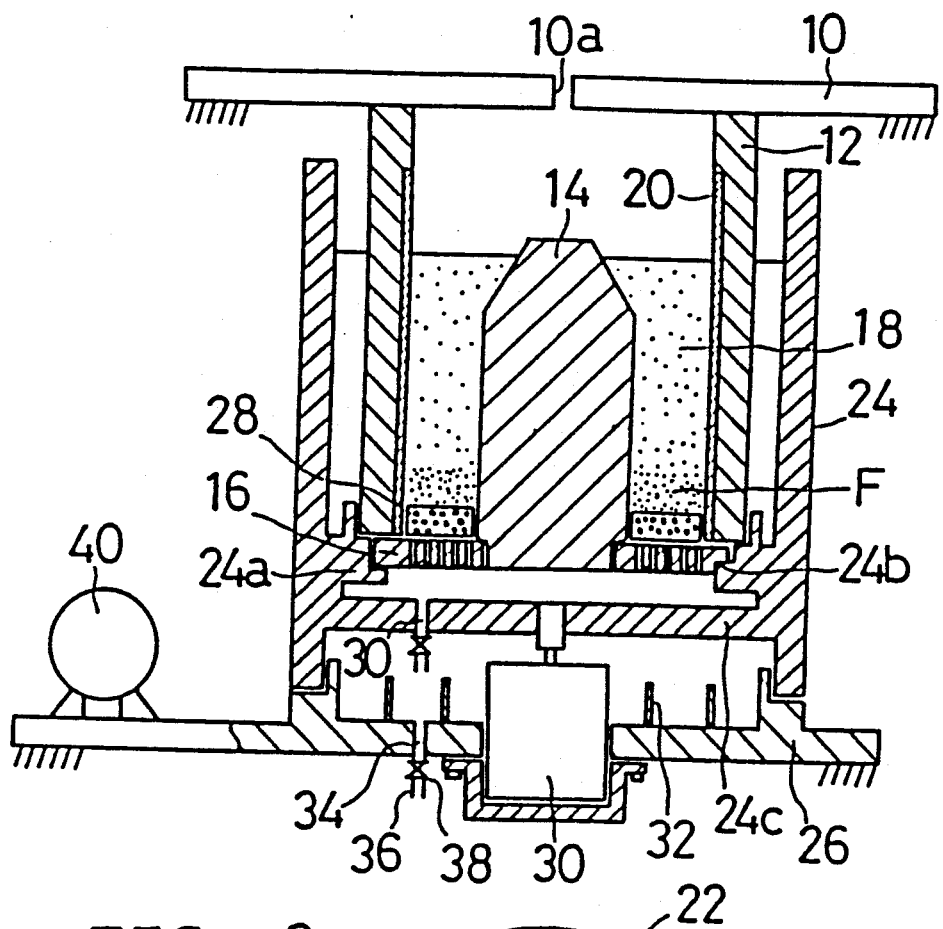
FIG. 1 is a front elevation view schematically illustrating a preferred embodiment of a fiber aggregate production apparatus according to this invention in cross section.
Figure 2:
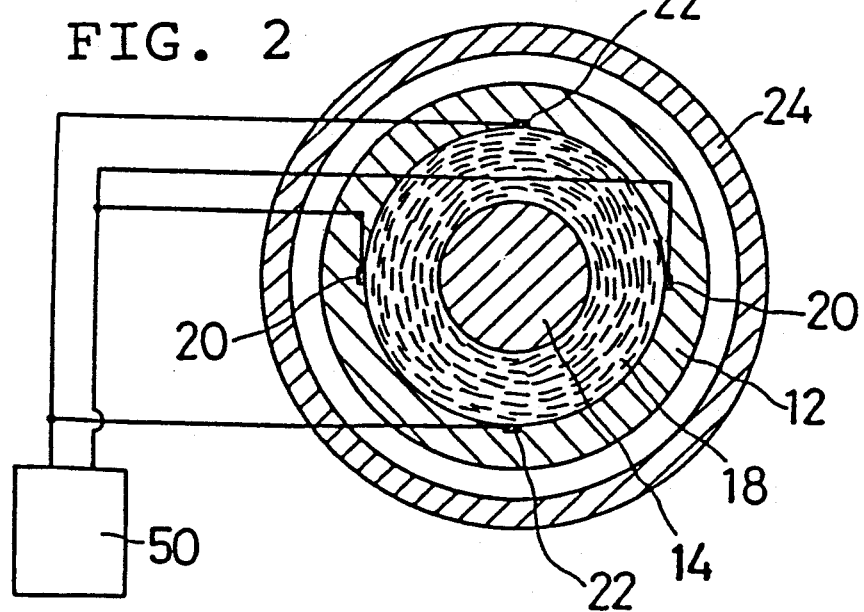
FIG. 2 is a plan view schematically illustrating the same in cross section.

In FIG. 1, a frame 10 is disposed at the top of the production apparatus horizontally, and has a solution supply hole 10a opened at the center portion thereof. An outer cylinder 12 is disposed on the bottom surface of the frame 10 integrally and perpendicularly. An inner cylinder 14, shown as a column shape in FIG. 1, is disposed in the outer cylinder 12 so that it aligns with the outer cylinder 12 concentrically. A disk shaped filter plate 16 is fixed on the bottom end of the inner cylinder 14, has a set of fine pores drilled in the vertical direction, and extends radially so as to cover the opening of the outer cylinder 12 at the bottom end. The outer cylinder 12, the inner cylinder 14 and the filter plate 16 form a bottomed container having an upright cylindrical space 18, and the upright cylindrical space 18 works as a fiber orientation space. Here, it is preferable to make the aforementioned component members, i.e. the component members other than the electrodes hereinafter described, from an insulating material.

Figure 3:
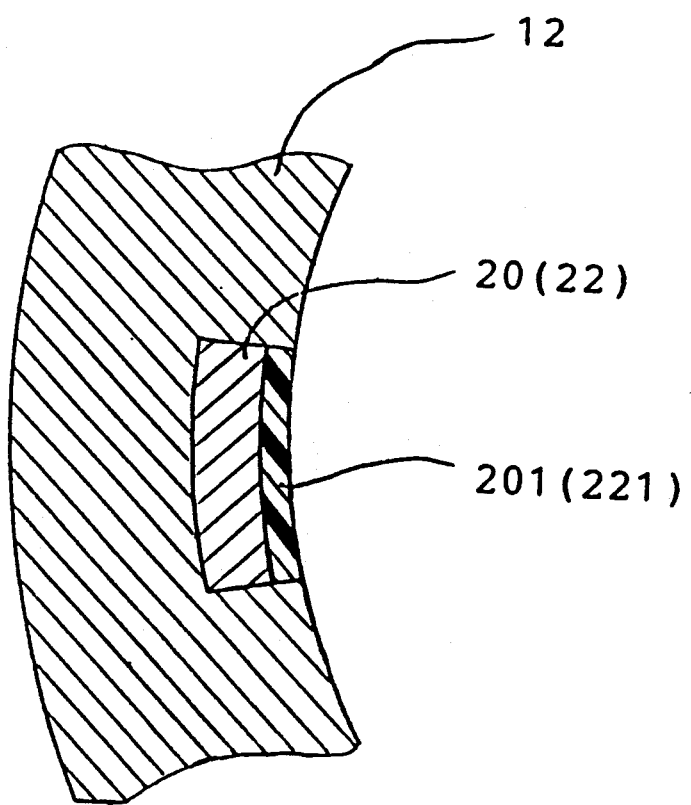
FIG. 3 is an enlarged cross sectional view schematically illustrating a portion around a positive electrode (or a negative electrode) coated with an anion exchange membrane (or a cation exchange membrane).
Figure 4:
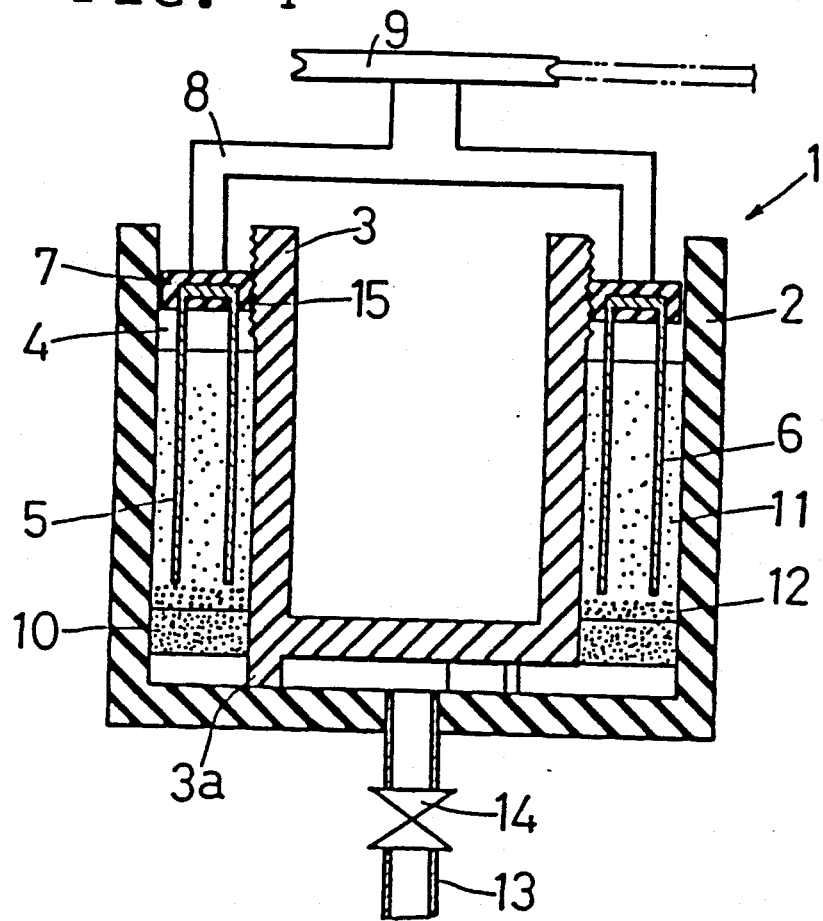
FIG. 4 is a cross sectional view of a fiber aggregate production apparatus of a prior art.
Figure 5:
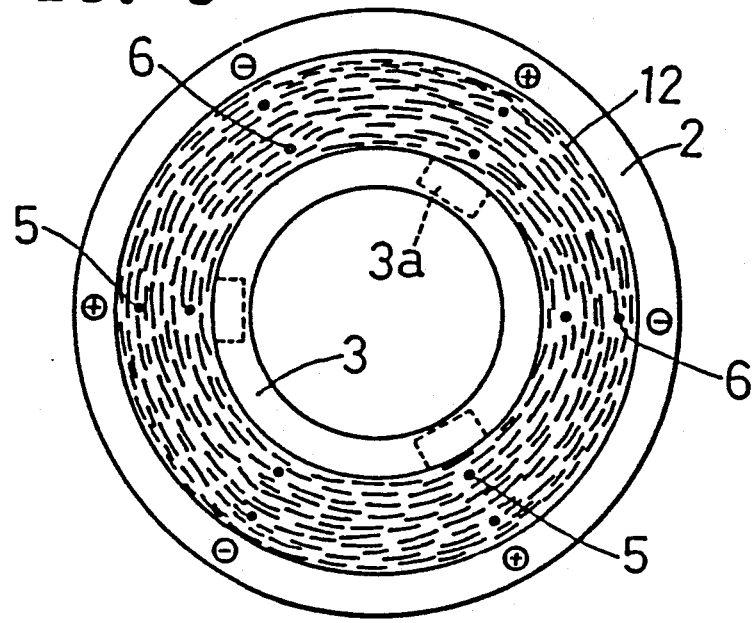
FIG. 5 is a partly abbreviated plan view illustrating the same.

A plurality of pairs of a positive electrode and a negative electrode 20 and 22 is buried perpendicularly in the inner periphery wall of the outer cylinder 12. As illustrated in FIG. 2, the positive electrodes 20 and the negative electrodes 22 are disposed by turns in the peripheral direction, and placed at intervals of equal space, so that electric fields of a substantially equal strength are generated between each of the pairs of the positive electrode 20 and the negative electrode 22. The exposed inner surfaces of the positive electrodes 20 and the negative electrodes 22 are formed so that they agree with the inner periphery wall of the outer cylinder 12, and coated with an anion exchange membrane 201 and a cation exchange membrane 221, respectively as illustrated in FIG. 3 when the membranes 201 and 221 are required. It is a matter of course that the positive electrodes 20 and the negative electrodes 22 are connected to a direct current voltage applicator 50 in order to generate the electric fields of the predetermined strength between each of the pairs of the positive electrode 20 and the negative electrode 22.

Further, a casing 24 surrounding the outer periphery wall of the outer cylinder 12 is provided, and disposed perpendicularly on a support bench 26 by way of a bearing (not shown). A projection 24a is formed on part of the inner periphery wall of the casing 24. The projection 24a engages with the filter plate 16 by way of a key portion 24b, for instance, and prevents the filter plate 16 from relatively rotating. A filter body 28 is fixed on the filter plate 16, and practically forms the bottom wall of the upright cylindrical space 18. The filter body 28 and the filter plate 16 are rotated together with the casing 24 around the axis of the upright cylindrical space 18 at a low speed by a motor 30, having a speed reducer directly connected to the casing 24. Finally, a through hole 34 which is drilled through the support bench 26, corresponds to a through hole 30 drilled through the bottom wall 24c of the casing 24, and communicates with the through hole 30 by way of a conduit portion 32. Each of the through holes 30 and 34 is connected to drain means which comprises a conduit 36, being connectable to a suction apparatus, and a cock 38. Moreover, a vibrator 40 is disposed on the support bench 26, whereby vibrating the whole production apparatus so as to eliminate uneven laminations in the fiber aggregate layer "F".

The thus arranged preferred embodiment of the fiber aggregate production apparatus according to this invention operates as follows. First of all, alumina short fibers free from the surface treatment were added to a dielectric fluid of carbon tetrachloride together with a trace amount of a nonionic surface active agent. The alumina short fibers had an average fiber diameter of approximately 3 $\mu$m and an average fiber length of 10 to 500 $\mu$m. The mixture was then stirred to obtain a fiber suspension in which the alumina fibers were dispersed. After generating electric fields of approximately 1 kv/cm in strength between each of the pairs of the positive and negative electrodes 20 and 22 in the fiber aggregate production apparatus, the fiber suspension was supplied into the upright cylindrical space 18 through the solution supply hole 10a.

The fibers supplied therein were polarized dielectrically in the dielectric fluid and oriented electrostatically in the peripheral tangent direction. Then, most of the oriented fibers were bridged to increase the masses thereof, and sedimented while maintaining the orientation in the peripheral tangent direction.

The fibers thus oriented and bridged were aggregated one after another on the filter body 28 by the discharging operation of the filtrate through the conduit 36, and the discharging operation which was performed simultaneously with the supplying operation of the fiber suspension. In addition, since the fiber aggregate layer "F" was displaced gradually as the filter body 28 rotated at a slow speed of approximately 15 minutes per one revolution, the fibers were laminated evenly in the peripheral tangent direction. Moreover, since the vibrator 40 was operated to vibrate the whole fiber aggregate production apparatus or container, the uneven density in the fiber aggregate layer "F" was also minimized effectively. After growing the fiber aggregate layer "F" to a predetermined thickness of approximately 15 mm, the residual fiber suspension was discharged and removed to take out a fiber aggregate of annular shape.

No fibers were separated and localized in the fiber aggregate of annular shape, rather the fibers are oriented in the peripheral tangent direction in an extremely uniform and favorable manner. Therefore, the fiber aggregate of annular shape could be utilized for producing pistons of various kinds, because a fiber reinforced metal of further enhanced strength in the direction perpendicular to the peripheral tangent direction and of less thermal expansion coefficient could be produced out of the fiber aggregate.

Having now fully described the invention, it will be apparent to one of ordinary skill in the art that many changes and modifications can be made thereto without departing from the spirit or scope of the invention as set forth herein.

What is claimed is:

1. An apparatus for producing annular fiber aggregate comprising:
   a container comprising an inner cylinder and an outer cylinder disposed concentrically, whereby forming an upright cylindrical space between said inner cylinder and said outer cylinder;
   at least two positive electrodes and two negative electrodes disposed in pairs with electrodes of similar charge arranged opposite each other and buried in a wall of said outer cylinder and aligned parallel to the axis of said upright cylindrical space;
   a filter member disposed at a lower portion of said upright cylindrical space; and
   a voltage applicator connected to said positive electrodes and said negative electrodes.

2. The apparatus for producing annular fiber aggregate according to claim 1 further comprising means for relatively rotating said outer cylinder and said filter member with respect to said inner cylinder around the axis of said upright cylindrical space.

3. The apparatus for producing annular fiber aggregate according to claim 2 further comprising drain means for discharging fluid disposed on the bottom wall of said container.

4. The apparatus for producing annular fiber aggregate according to claim 1, wherein said positive and negative electrodes are equally spaced.

5. The apparatus for producing annular fiber aggregate according to claim 1, wherein said positive and negative electrodes are coated with anion exchange membrane and cation exchange membrane, respectively.

6. The apparatus for producing annular fiber aggregate according to claim 1 further comprising a vibrator for vibrating said container.

7. The apparatus for producing annular fiber aggregate according to claim 1, wherein said voltage applicator is a direct current voltage applicator.

* * * * *